United States Patent
Sakai et al.

(10) Patent No.: US 12,206,311 B2
(45) Date of Patent: Jan. 21, 2025

(54) OUTER DIAMETER SIDE MAGNET FIELD AND MAGNETIC GEAR

(71) Applicant: MITSUBISHI HEAVY INDUSTRIES, LTD., Tokyo (JP)

(72) Inventors: Masayuki Sakai, Tokyo (JP); Yasutaka Aoki, Tokyo (JP); Takayuki Shimizu, Tokyo (JP); Ryoji Okabe, Tokyo (JP); Akihiko Umeda, Tokyo (JP); Takatoshi Matsushita, Tokyo (JP); Mikito Sasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 259 days.

(21) Appl. No.: 17/794,069

(22) PCT Filed: Jan. 20, 2021

(86) PCT No.: PCT/JP2021/001855
§ 371 (c)(1),
(2) Date: Jul. 20, 2022

(87) PCT Pub. No.: WO2021/149722
PCT Pub. Date: Jul. 29, 2021

(65) Prior Publication Data
US 2023/0049224 A1 Feb. 16, 2023

(30) Foreign Application Priority Data
Jan. 24, 2020 (JP) .................................. 2020-009607

(51) Int. Cl.
*H02K 49/10* (2006.01)
(52) U.S. Cl.
CPC .................................. *H02K 49/102* (2013.01)

(58) Field of Classification Search
CPC ........ H02K 49/102; H02K 1/18; H02K 1/185; H02K 1/278; H02K 1/82; H02K 49/02
(Continued)

(56) References Cited

U.S. PATENT DOCUMENTS

| 4,933,584 A * | 6/1990 | Harms ................... H02K 1/278 |
| | | 310/156.47 |
| 8,466,592 B2 | 6/2013 | Atallah et al. |
| (Continued) | | |

FOREIGN PATENT DOCUMENTS

| DE | 102011121042 A1 | 6/2012 |
| EP | 3208913 A1 | 8/2017 |
| (Continued) | | |

OTHER PUBLICATIONS

International Search Report issued in corresponding International Application No. PCT/JP2021/001855, dated Feb. 22, 2021 (8 pages).
(Continued)

*Primary Examiner* — Christopher M Koehler
*Assistant Examiner* — Theodore L Perkins
(74) *Attorney, Agent, or Firm* — Osha Bergman Watanabe & Burton LLP (57) ABSTRACT

An outer diameter side magnet field pole piece assembly for a magnetic gear which is disposed on an outer circumferential side of a plurality of magnetic pole pieces disposed on an outer circumferential side of the outer diameter side magnet field pole piece assembly along a circumferential direction, includes: a plurality of magnetic pole pairs disposed on the outer circumferential side of the plurality of magnetic pole pieces along the circumferential direction; and a support member for supporting the plurality of magnetic pole pairs from the outer circumferential side. A space along an axial direction is formed in at least a part between an outer circumferential surface of each of the plurality of
(Continued)

magnetic pole pairs and an opposite surface of an inner circumferential surface of the support member opposite to the outer circumferential surface of each of the plurality of magnetic pole pairs.

5 Claims, 6 Drawing Sheets

(58) Field of Classification Search
USPC .......................................................... 310/103
See application file for complete search history.

(56) References Cited

U.S. PATENT DOCUMENTS

| | | | |
|---|---|---|---|
| 9,425,655 B2 | 8/2016 | Calverley et al. | |
| 2008/0309189 A1* | 12/2008 | Pabst | H02K 1/185 310/216.008 |
| 2012/0194021 A1 | 8/2012 | Nakatsugawa et al. | |
| 2014/0265751 A1* | 9/2014 | Ellzey, Jr. | H02K 1/278 310/156.01 |
| 2015/0075886 A1* | 3/2015 | Tonari | H02K 51/00 180/65.245 |
| 2017/0201167 A1* | 7/2017 | Bendixen | F04D 25/026 |
| 2018/0212482 A1* | 7/2018 | Nigo | H02K 7/14 |
| 2018/0269770 A1 | 9/2018 | Powell et al. | |
| 2021/0194303 A1 | 6/2021 | Pfannschmidt et al. | |
| 2021/0265905 A1 | 8/2021 | Jungmayr et al. | |

FOREIGN PATENT DOCUMENTS

| | | |
|---|---|---|
| JP | 2007252079 A | 9/2007 |
| JP | 5286373 B2 | 9/2013 |
| JP | 2015-027234 A | 2/2015 |
| WO | 2019-204848 A1 | 10/2019 |

OTHER PUBLICATIONS

International Preliminary Report on Patentability issued in corresponding International Application No. PCT/JP2021/001855, mailed Aug. 4, 2022 (10 pages).

The extended European Search Report dated May 23, 2023, issued to the corresponding EP application No. 21744143.5 (11 pages).

* cited by examiner

OUTER DIAMETER SIDE MAGNET FIELD AND MAGNETIC GEAR

TECHNICAL FIELD

The present disclosure relates to an outer diameter side magnet field and a magnetic gear including the outer diameter side magnet field.

The present application claims priority on Japanese Patent Application No. 2020-009607 filed on Jan. 24, 2020, the entire content of which is incorporated herein by reference.

BACKGROUND

As one type of gear device, there is a magnetic gear which utilizes an attractive force and a repulsive force of a magnet to transmit torque or motion in a non-contact manner, thereby being able to avoid a problem such as wear, vibration, or noise caused by tooth contact. A flux-modulated type (harmonic type) magnetic gear of the magnetic gear includes an inner circumferential side magnet field and an outer circumferential side magnet field concentrically (coaxially) disposed, and a magnetic pole piece device which has a plurality of magnetic pole pieces (pole pieces) and a plurality of non-magnetic bodies each being disposed with a gap (air gap) between these two magnet fields and alternately arranged in the circumferential direction (see Patent Documents 1 and 2). Then, magnetic fluxes of magnets of the above-described two magnet fields are modulated by the above-described respective magnetic pole pieces to generate harmonic magnetic fluxes, and the above-described two magnet fields are synchronized with the harmonic magnetic fluxes, respectively, thereby operating the flux-modulated type magnetic gear.

For example, in a magnetic geared motor in which the flux-modulated type magnetic gear and a motor are integrated, the above-described outer circumferential side magnet field is fixed to function as a stator, as well as the above-described inner circumferential side magnet field is functioned as a high-speed rotor and the above-described magnetic pole piece device is functioned as a low-speed rotor. Then, by rotating the high-speed rotor by a magnetomotive force of a coil, the low-speed rotor rotates according to the reduction ratio. As the magnetic geared motor, for example, a type in which a permanent magnet is installed in a high-speed rotor and a stator, or a type in which a permanent magnet is installed only in a high-speed rotor is known.

CITATION LIST

Patent Literature

Patent Document 1: U.S. Pat. No. 9,425,655B
Patent Document 2: JP5286373B

SUMMARY

Technical Problem

In a magnetic geared motor, a generator, or the like which uses a magnetic gear where the coil is installed in the outer diameter side magnet field described above, a plurality of magnetic pole pairs (hereinafter, stator magnets) of the outer diameter side magnet field are located in proximity to the coil and are affected by heat generated by the coil. Further, the stator magnet is also in proximity to the plurality of magnetic pole pieces of the magnetic pole piece device described above, and is also affected by heat due to an iron loss or the like in the magnetic pole pieces. Herein, active heat removal is usually performed by, for example, supplying a cooling medium (such as air) to an air gap between the magnetic pole piece device and two magnet fields adjacent (opposite) to the magnetic pole piece device on the outer side and the inner side in the radial direction.

However, a temperature tolerance (temperature spec) of the stator magnet is usually stricter than that of the coil. Further, since the cooling medium supplied to the air gap flows through the air gap along the axial direction, the longer the air gap is in the axial direction, the higher the temperature of the cooling medium as the cooling medium flows, resulting in a decrease in cooling performance on the downstream side. Thus, the temperature of the stator magnet may exceed the spec, even though the temperature of the coil is within the temperature tolerance and there is a margin.

In view of the above, an object of at least one embodiment of the present invention is to provide an outer diameter side magnet field of a magnetic gear having an improved cooling capacity with respect to a magnetic pole pair.

Solution to Problem

An outer diameter side magnet field according to at least one embodiment of the present invention is an outer diameter side magnet field of a magnetic gear which is disposed on an outer circumferential side of a plurality of magnetic pole pieces disposed on an outer circumferential side of an inner diameter side magnet field along a circumferential direction, that includes: a plurality of magnetic pole pairs disposed on the outer circumferential side of the plurality of magnetic pole pieces along the circumferential direction; a support member for supporting the plurality of magnetic pole pairs from the outer circumferential side; and a coil installed in the support member. The support member includes: a yoke part; a teeth part protruding from the yoke part to an inner side in a radial direction and having an iron core portion around which the coil is wound; and a hook part extending in the circumferential direction from an inner portion of the teeth part in the radial direction. A space is provided between an outer circumferential surface of the hook part and an end surface of the coil on the inner side in the radial direction.

A magnetic gear according to at least one embodiment of the present invention includes: the above-described outer diameter side magnet field; an inner diameter side magnet field disposed on an inner diameter side relative to the outer diameter side magnet field; and a plurality of magnetic pole pieces disposed between the outer diameter side magnet field and the inner diameter side magnet field along a circumferential direction.

Advantageous Effects

According to at least one embodiment of the present invention, provided is an outer diameter side magnet field of a magnetic gear having an improved cooling capacity with respect to a magnetic pole pair.

DETAILED DESCRIPTION

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

(Configuration of Magnetic Gear)

Figure 1:
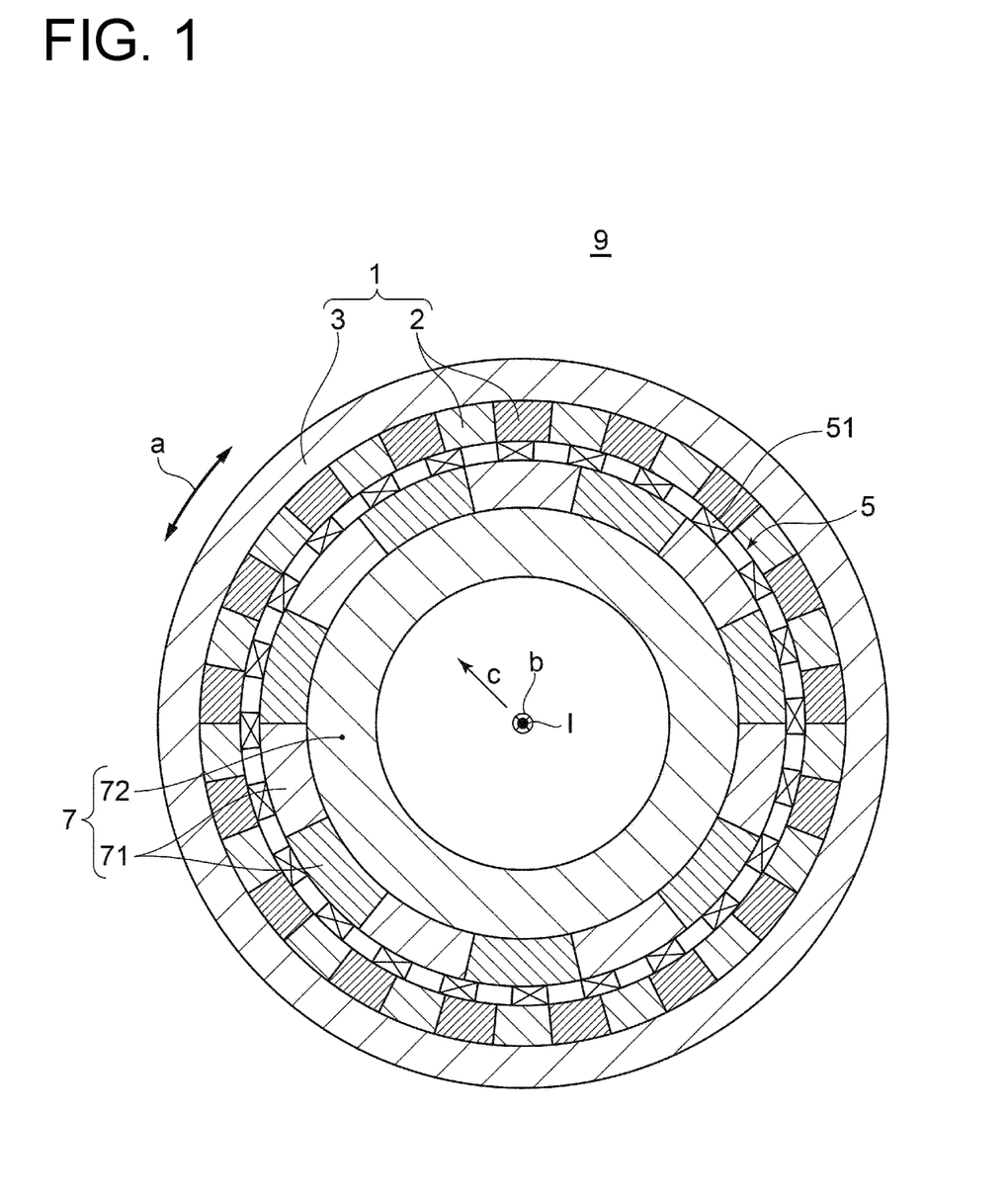
FIG. 1 is a cross-sectional view of a magnetic gear along the radial direction according to an embodiment of the present invention.
Figure 2:
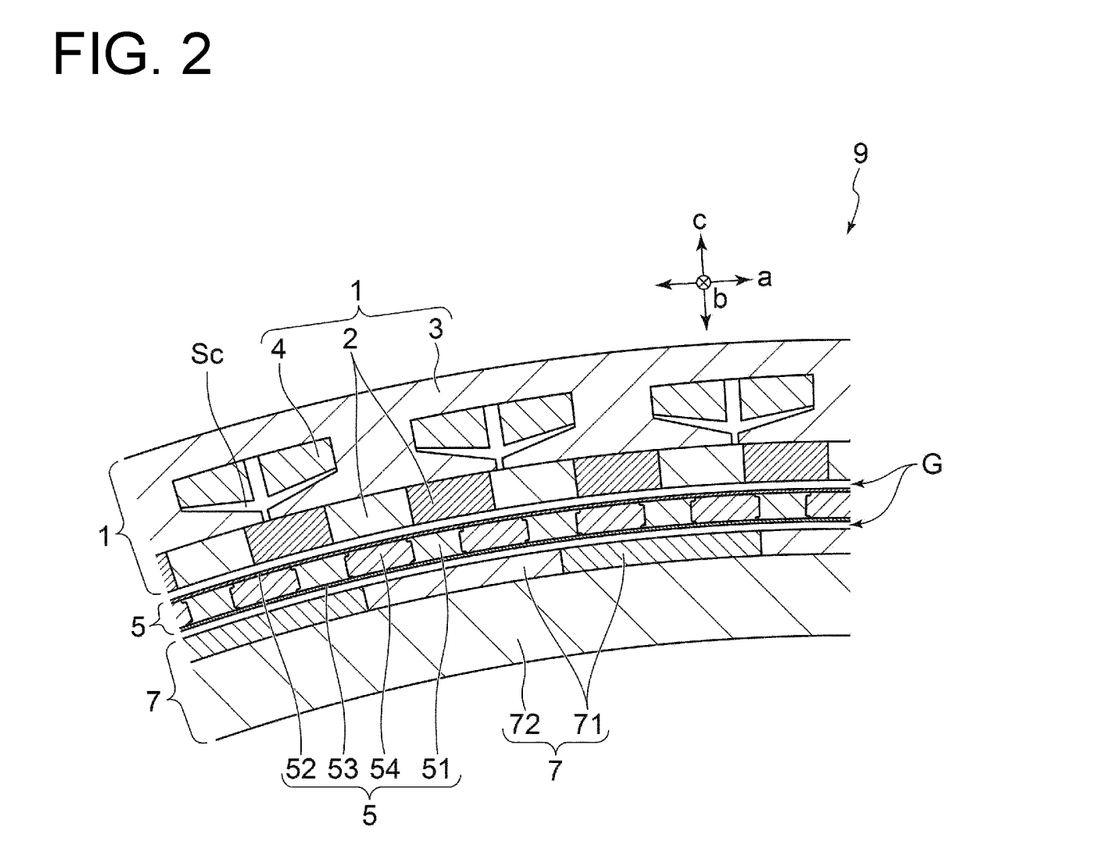
FIG. 2 is a partially enlarged view of the magnetic gear shown in FIG. 1.
Figure 3:
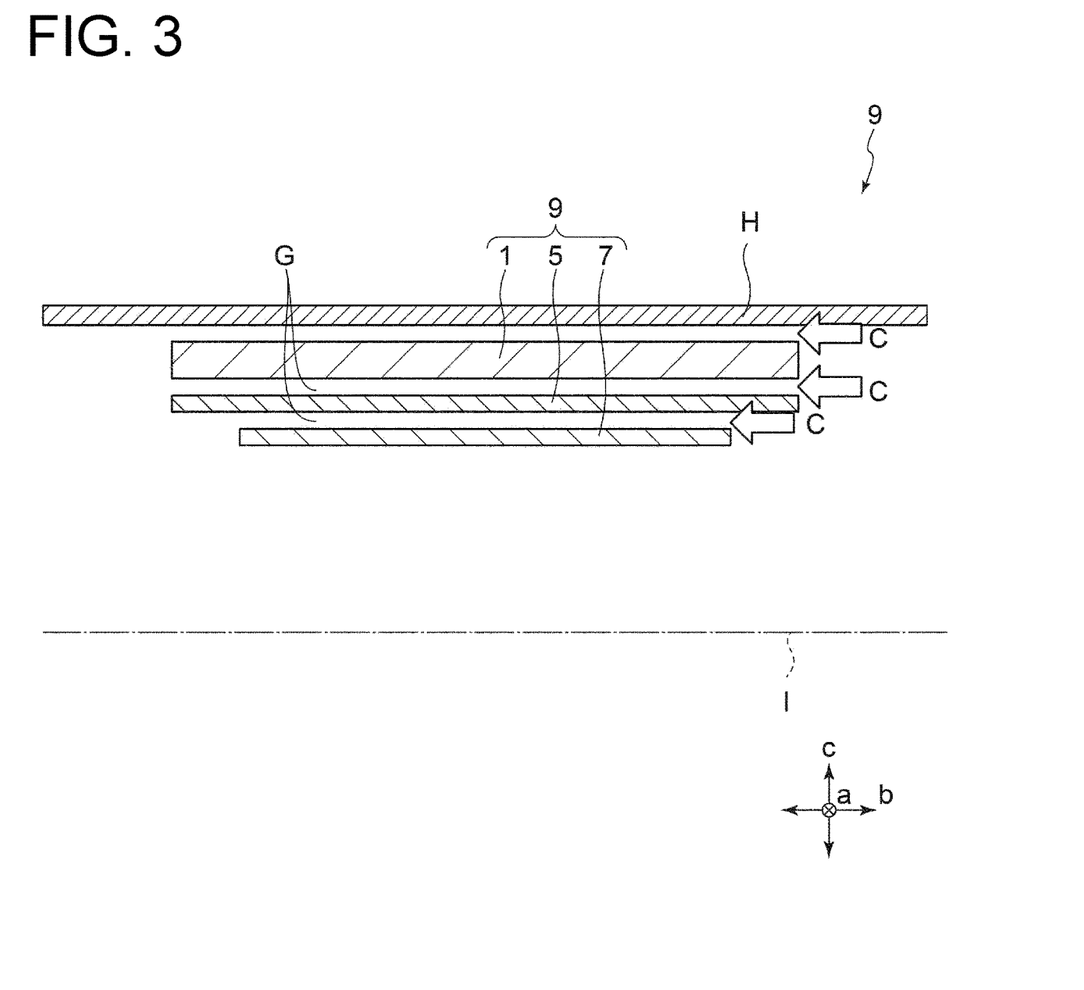
FIG. 3 is a cross-sectional view of the magnetic gear along the axial direction according to an embodiment of the present invention.

FIG. 1 is a cross-sectional view of a magnetic gear 9 along a radial direction c according to an embodiment of the present invention. FIG. 2 is a partially enlarged view of the cross section of the magnetic gear 9 shown in FIG. 1. FIG. 3 is a cross-sectional view of the magnetic gear 9 along an axial direction b according to an embodiment of the present invention. In the following, a description will be given with a direction along a rotation direction of the magnetic gear 9 (magnetic pole piece device 5) being a circumferential direction a, a direction along a rotational axis of the magnetic gear 9 being an axial direction b, and a direction (radial direction) orthogonal to the circumferential direction a and the axial direction b described above being a radial direction c.

The magnetic gear 9 is a device having a mechanism for transmitting torque in a non-contact manner by utilizing an attractive force and a repulsive force of a magnet. The magnetic gear 9 shown in FIGS. 1 to 3 is of a flux-modulated type (harmonic type) and, as illustrated, includes an outer diameter side magnet field 1 (outer rotor) having a cylindrical shape (annular; the same applies hereinafter) as a whole, an inner diameter side magnet field 7 (inner rotor) having a cylindrical or columnar shape as a whole, and a magnetic pole piece device 5 (center rotor) having a cylindrical shape as a whole. Then, the magnetic gear 9 has a structure where the outer diameter side magnet field 1, the inner diameter side magnet field 7, and the magnetic pole piece device 5 are disposed at intervals (air gaps G) of a constant distance from each other in the radial direction c on a same axis l (coaxial) such that the magnetic pole piece device 5 is disposed between the outer diameter side magnet field 1 and the inner diameter side magnet field 7. That is, the outer diameter side magnet field 1 is disposed on the radially outer side (outer diameter side) relative to the inner diameter side magnet field 7. Further, the magnetic pole piece device 5 is disposed between the inner diameter side magnet field 7 and the outer diameter side magnet field 1. Then, the outer diameter side magnet field 1, the inner diameter side magnet field 7, and the magnetic pole piece device 5 are disposed concentrically.

Further, as shown in FIG. 2, the outer diameter side magnet field 1 and the inner diameter side magnet field 7 described above, respectively, include magnetic pole pairs (2, 71), such as permanent magnets, which are composed of a plurality of N poles and S poles disposed at intervals (regular intervals) on the circumference in a cross section of the magnetic gear 9 cut along the radial direction c (hereinafter, the radial cross section). More specifically, the outer diameter side magnet field 1 includes the plurality of magnetic pole pairs 2 and a support member 3 for supporting the plurality of magnetic pole pairs 2. Then, on the cylindrical inner circumferential surface of the outer diameter side magnet field 1, the plurality of magnetic pole pairs 2 are installed over the whole circumference in a state where the magnetic poles face the radial direction c and such that the N poles and the S poles are alternated along the circumferential direction. Likewise, the above-described inner diameter side magnet field 7 includes the plurality of inner diameter magnetic pole pairs 71 and a columnar inner diameter support member 72 for supporting the plurality of inner diameter magnetic pole pairs 71. Then, on the cylindrical outer circumferential surface of the inner diameter side magnet field 7, the plurality of inner diameter magnetic pole pairs 71 are installed over the whole circumference along the circumferential direction a, in the same manner as above. Further, the magnetic pole piece device 5 includes a plurality of magnetic pole pieces 51 (pole pieces) disposed at intervals (regular intervals) from each other over the whole circumference in the circumferential direction a. Then, for example, if the inner diameter side magnet field 7 is rotated, the magnetic flux of the inner diameter side magnet field 7 is modulated by the magnetic pole pieces 51 of the magnetic pole piece device 5, and rotational torque is generated in the magnetic pole piece device 5 by the action of the modulated magnetic field and the outer diameter side magnet field 1.

For example, as shown in FIG. 2, the above-described magnetic pole piece device 5 may include an outer circumferential cover member 52 and an inner circumferential cover member 53 disposed on the outer side and the inner side in the radial direction c so as to sandwich the above-described plurality of magnetic pole pieces 51. The outer circumferential cover member 52 and the inner circumferential cover member 53 are members each having a cylindrical shape, and the diameter of the inner circumferential cover member 53 is smaller than the diameter of the outer circumferential cover member 52. Thus, if the inner circumferential cover member 53 is disposed coaxially on the inner side of the outer circumferential cover member 52, a cylindrical space is formed over the entire circumference between the inner circumferential surface of the outer circumferential cover member 52 and the outer circumferential surface of the inner circumferential cover member 53. Then, in the cylindrical space, the plurality of long magnetic pole pieces 51 are disposed at intervals in the circumferential direction a with a longitudinal direction of each of the magnetic pole pieces 51 oriented along the axial direction b. At this time, a section (interjacent space 54) between the plurality of magnetic pole pieces 51 may be a space, or a non-magnetic body may be installed in the section. However, the magnetic pole piece device 5 may not have the above-described two cover members, or may be configured to include the non-magnetic body installed between the plurality of magnetic pole pieces 51.

In the embodiments shown in FIGS. 1 to 3, the magnetic gear 9 (flux-modulated type magnetic gear) is integrated with a motor to form a magnetic geared motor. In more details, a plurality of coils 4 (see FIG. 2) are installed in the outer diameter side magnet field 1 to each be used as a stator, and the inner diameter side magnet field 7 (high-speed rotor) is rotated by a magnetomotive force of the coils 4. Thus, the magnetic pole piece device 5 (low-speed rotor) rotates according to the reduction ratio which is determined by the ratio of the number of pole pairs of the magnetic pole pairs 2 of the outer diameter side magnet field 1 to the number of pole pairs of the inner diameter magnetic pole pairs 71 of the inner diameter side magnet field 7.

The magnetic gear 9 is also applicable to a magnetic geared generator in which a flux-modulated type magnetic gear and a generator are integrated. The magnetic geared generator is different from the magnetic geared motor in that the high-speed rotor rotates with the rotation of the low-speed rotor, but is the same as the magnetic geared motor in configuration of the low-speed rotor, the high-speed rotor, and the stator.

Further, the magnetic geared motor is supplied with a cooling medium C, such as air or water, in order to protect the above-described constituent elements from heat generated during operation. In the embodiments shown in FIGS. 1 to 3, as shown in FIG. 3, the air gaps G are formed between the inner diameter side magnet field 7 and the magnetic pole piece device 5 and between the outer diameter side magnet field 1 and the magnetic pole piece device 5, respectively. Then, the cooling medium C is supplied to each of these cylindrical air gaps G so as to flow from one end side toward another end side. Further, the cooling medium C is similarly supplied to a gap formed between the outer diameter side magnet field 1 and a housing H located on the outer circumferential side thereof. A gas such as air may be supplied to the gap between the outer diameter side magnet field 1 and the housing H described above, or a water cooling tube may be installed to flow cooling water or the like through the water cooling tube.

In the magnetic gear 9 (flux-modulated type magnetic gear) having the above configuration, in the magnetic gear 9 of the type where the coil is installed in the outer diameter side magnet field, the plurality of magnetic pole pairs 2 (hereinafter, stator magnets) of the above-described outer diameter side magnet field 1 are affected by heat generated from the magnetic pole piece devices 5 (plurality of magnetic pole pieces 51), the coil 4, or the like proximally disposed. However, the temperature tolerance of the stator magnet is stricter than that of the coil 4, for example, the upper limit of the temperature tolerance of the stator magnet is 110° C. and that of the coil is 180° C. Further, since the cooling medium C supplied to the air gap G flows through the air gap G along the axial direction b, the longer the air gap G is in the axial direction b, the higher the temperature of the cooling medium C as the cooling medium C flows, resulting in a decrease in cooling performance on the downstream side. Thus, even if the cooling medium C is supplied to the air gap G for cooling, the temperature of the stator magnet may exceed the spec, despite that the temperature of the coil 4 is within the temperature tolerance and there is a margin. Thus, the outer diameter side magnet field 1 is configured as follows.

(Common Configuration of Outer Diameter Side Magnet Field 1)

Hereinafter, the outer diameter side magnet field 1 will be described in detail with reference to FIGS. 2 and 4 to 8.

FIGS. 4 to 8 are each a cross-sectional view schematically showing a part of the outer diameter side magnet field 1 according to an embodiment of the present invention.

As described above, the outer diameter side magnet field 1 is a magnet field (stator member) which is disposed on the further outer circumferential side of the plurality of magnetic pole pieces 51 (magnetic pole piece device 5) disposed on the outer circumferential side of the cylindrical inner diameter side magnet field 7 along the circumferential direction a. As shown in FIGS. 2 and 4 to 8, the outer diameter side magnet field 1 includes the plurality of magnetic pole pairs 2 which are disposed (annularly disposed) on the outer circumferential side of the magnetic pole piece device 5 including the plurality of magnetic pole pieces 51 along the circumferential direction a, the support member 3 for supporting the plurality of magnetic pole pairs 2 from the outer circumferential side, and the coil 4 installed in the support member 3.

More specifically, the above-described support member 3 includes a yoke part 31 having a cylindrical shape as a whole, a teeth part 32 protruding radially inward from the yoke part 31 and having an iron core portion 32p where the coil 4 is wound, and a hook part 33 extending from the teeth part 32 to both sides in the circumferential direction a. Then, an inner circumferential surface 3s of the support member 3 is formed by the respective inner circumferential surfaces of the teeth part 32 and the hook part 33, and the plurality of magnetic pole pairs 2 are held on the inner circumferential surface 3s.

More specifically, in the embodiments shown in FIGS. 2 and 4 to 8, as shown in FIGS. 4 to 8, the support member 3 includes a plurality of protruding parts 34 protruding radially inward from the inner circumferential surface 3s of the support member 3. The protruding parts 34 may be disposed continuously or discretely along the axial direction b. Then, each magnetic pole pair 2 is supported (held) by being fitted between any of two adjacent protruding parts 34 among the plurality of protruding parts 34.

First Embodiment

Figure 4:
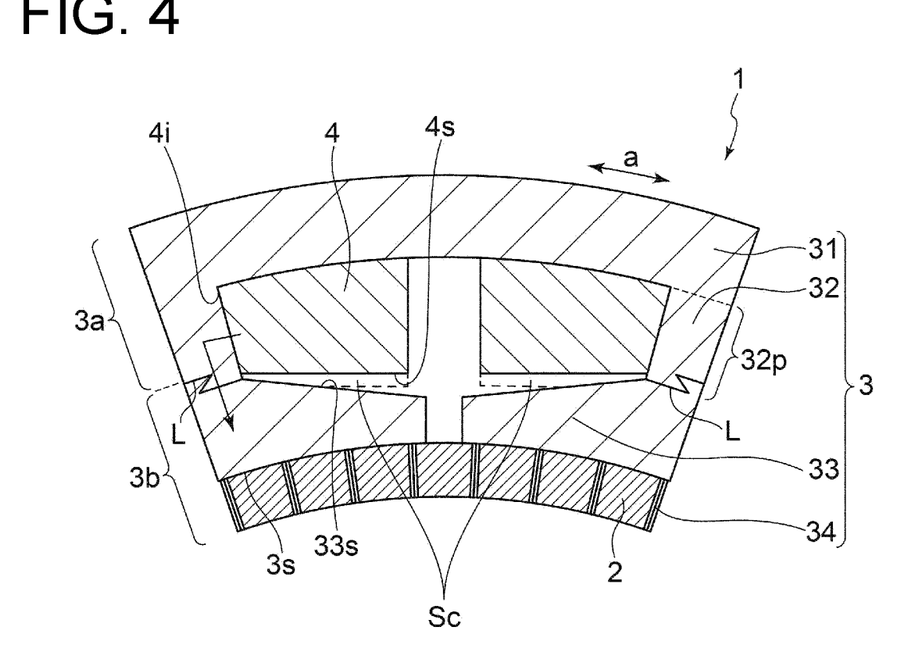
FIG. 4 is a cross-sectional view schematically showing a part of an outer diameter side magnet field according to an embodiment of the present invention.
Figure 5:
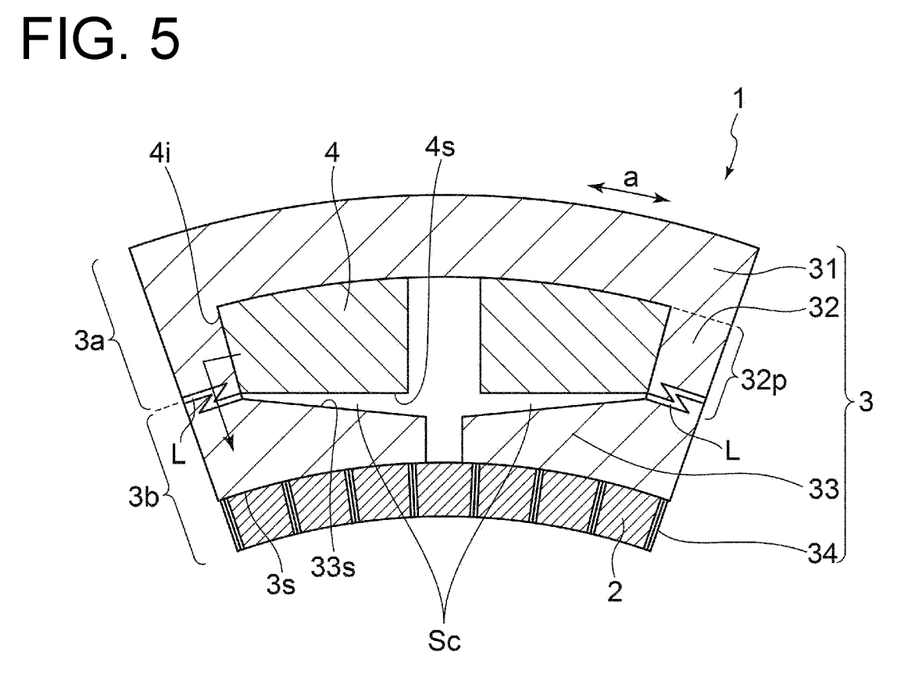
FIG. 5 is a cross-sectional view schematically showing a part of the outer diameter side magnet field according to an embodiment of the present invention.

In some embodiments, as shown in FIGS. 2, 4, and 5, the outer diameter side magnet field 1 having the above configuration includes a space (coil end space Sc) between a surface (outer circumferential surface 33s) of the above-described hook part 33 facing radially outward and a surface of the end portion (end surface 4s) of the above-described coil 4 facing radially inward. In some embodiments, the coil end space Sc may be disposed over the entire area of the outer circumferential surface 33s of the hook part 33, as illustrated. In the embodiments shown in FIGS. 2, 4. and 5, as illustrated, the coil 4 is installed away from the hook part 33 so that the outer circumferential surface 33s of the hook part 33 does not enter an inner space surrounded by an inner surface 4i which is a surface facing the circumferential direction a and is opposite to the support member 3 (iron core portion 32p), in a radial cross-sectional view. Thus, the above-described end surface 4s of the coil 4 is separated over the entire area of the outer circumferential surface 33s of the hook part 33.

However, the present invention is not limited to the present embodiment. In some other embodiments, as indicated by dashed lines in FIG. 4, only a part of the outer circumferential surface 33s of the hook part 33 may be separated from the above-described end surface 4s of the coil 4, for example, the hook part 33 is installed such that a part of the outer circumferential surface 33s of the hook part 33 fits in the above-described inner space of the coil 4 in the radial cross-sectional view. For example, the dashed lines in FIG. 4 indicate that a section from a root of the hook part 33 to the vicinity of the center of the length of the outer circumferential surface in the radial direction c fits in the inner space of the coil 4, in the radial cross-sectional view.

With the above configuration, the outer diameter side magnet field 1 includes the plurality of magnetic pole pairs 2 and the support member 3 for the plurality of magnetic pole pairs 2 (stator magnets), and the space (coil end space Sc) is provided between the outer circumferential surface 33s of the hook part 33 of the support member 3 and the end surface 4s of the coil 4 facing radially inward. Thus, it is possible to reduce or eliminate a contact area between the coil 4 and the hook part 33, and it is possible to suppress the amount of heat transfer transmitted in the path of the coil 4→the hook part 33→the magnetic pole pair 2. In other words, since the main heat transfer path is the coil 4→the teeth part 32 (iron core portion 32p)→the hook part 33→the magnetic pole pair 2, heat conduction resistance between the coil 4 and the magnetic pole pair 2 increases, and it is possible to reduce the amount of heat transfer from the coil 4 to the magnetic pole pair 2. Further, since the cooling medium C can flow through the above-described space, it is possible to increase a surface (cooling surface) of the coil 4 and the support member 3 in contact with the cooling medium C, and it is possible to have a structure where the outer diameter side magnet field 1 is cooled more easily. Thus, it is possible to provide the outer diameter side magnet field 1 improved in reliability, for example, it is possible to more reliably prevent the situation where the temperature of the magnetic pole pair 2 of the outer diameter side magnet field 1 exceeds the upper limit value.

In the above-described embodiments, in some embodiments, as shown in FIGS. 4 and 5, a low thermal conductive layer L having a lower thermal conductivity than the surroundings may be formed between the yoke part 31 and the inner circumferential surface 3s of the support member 3 described above. Since the above-described coil 4 and the above-described plurality of magnetic pole pairs 2 are connected via the support member 3, heat is transferred between the coil 4 and the plurality of magnetic pole pairs 2 via the support member 3. Thus, the low thermal conductive layer L is disposed between the coil 4 and the plurality of magnetic pole pairs 2 described above in the support member 3 so as to intersect the heat transfer path. In other words, the low thermal conductive layer L is provided for the support member 3 such that heat transferred between the coil 4 and the plurality of magnetic pole pairs 2 always passes through the low thermal conductive layer L.

In the embodiments shown in FIGS. 4 and 5, the low thermal conductive layer L is formed so as to include the iron core portion 32p. More specifically, the low thermal conductive layer L is disposed so as to connect positions on the surface of the iron core portion 32p that are not accommodated in the inner space (described above) of the coil 4. Thus, it is possible to reduce the area of the low thermal conductive layer L.

However, the present invention is not limited to the present embodiment. In some other embodiments, the low thermal conductive layer L may be provided for other than the iron core portion 32p. More specifically, the low thermal conductive layer L may be disposed over both the hook part 33 and a section of the teeth part 32 including the iron core portion 32p or a section of the teeth part 32 including other than the iron core portion 32p. For example, if the coil 4 is installed as indicated by dashed lines in FIG. 4, the low thermal conductive layer L is disposed so as to connect the outer circumferential surfaces 33s of the hook part 33 forming the coil end space Sc.

With the above configuration, the low thermal conductive layer L is disposed on the heat path between the coil 4 and each magnetic pole pair 2. Thus, the heat of the coil 4 via the support member 3 can be less likely to be transferred to the magnetic pole pair 2, and by giving prior protection to the magnetic pole pair 2 with a relatively strict temperature tolerance over the coil 4 with a relatively gentle temperature tolerance, it is possible to more reliably protect the outer diameter side magnet field 1 from the heat of the magnetic pole pair 2.

The above-described low thermal conductive layer L may be formed on a joint surface of the support member 3 divided into a plurality of parts such as two. More specifically, in some embodiments, as shown in FIGS. 4 and 5, the support member 3 may be formed by joining an outer circumferential side support member 3a which includes at least the yoke part 31, and an inner circumferential side support member 3b which is supported on the inner circumferential side of the outer circumferential side support member 3a and includes at least a portion of the hook part 33. In this case, the low thermal conductive layer L is formed between the above-described outer circumferential side support member 3a and the above-described inner circumferential side support member 3b.

In the embodiments shown in FIGS. 4 and 5, the support member 3 is formed by joining the outer circumferential side support member 3a and the inner circumferential side support member 3b divided into two at a position of the iron core portion 32p which is not accommodated in the inner space (described above) of the coil 4.

Then, in the embodiment shown in FIG. 4, the low thermal conductive layer L is formed in the support member 3 by joining the outer circumferential side support member 3a and the inner circumferential side support member 3b with an adhesive agent capable of constituting the low thermal conductive layer L. On the other hand, in the embodiment shown in FIG. 5, the outer circumferential side support member 3a and the inner circumferential side support member 3b respectively have fitting portions, and the low thermal conductive layer L is formed in the support member 3 by fitting the outer circumferential side support member 3a and the inner circumferential side support member 3b in a state where a member capable of constituting the low thermal conductive layer L is interposed.

With the above configuration, the support member 3 is formed of the outer circumferential side support member 3a and the inner circumferential side support member 3b, and the low thermal conductive layer L is disposed between these joint portions. Thus, the low thermal conductive layer L can easily and appropriately be formed with respect to the outer diameter side magnet field 1.

Second Embodiment

Figure 6:
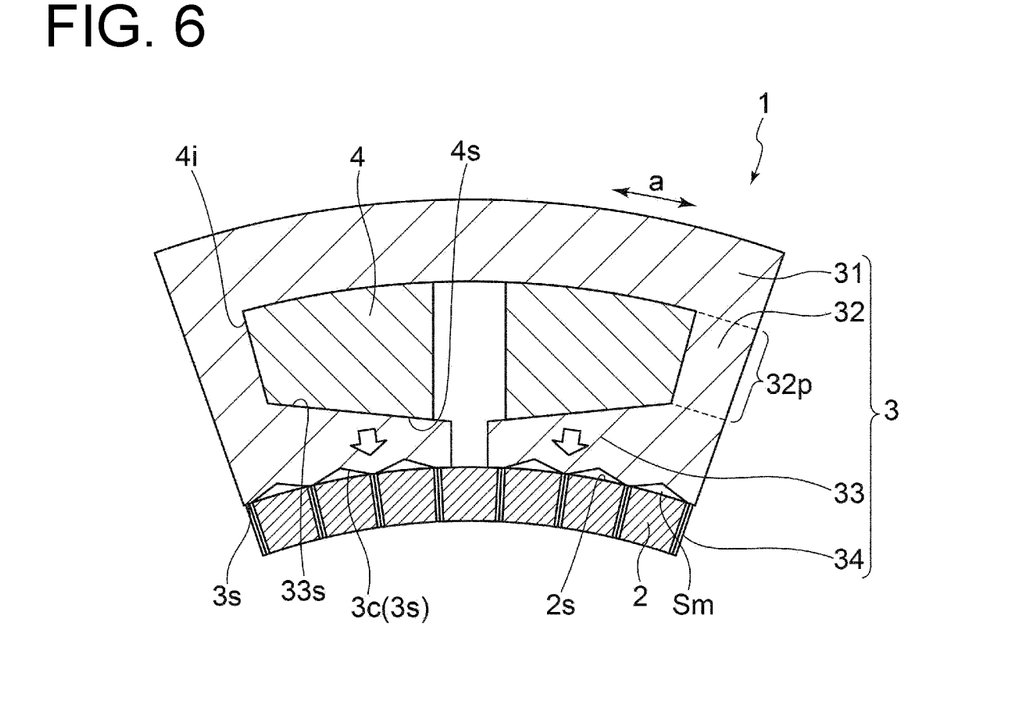
FIG. 6 is a cross-sectional view schematically showing a part of the outer diameter side magnet field according to an embodiment of the present invention.
Figure 7:
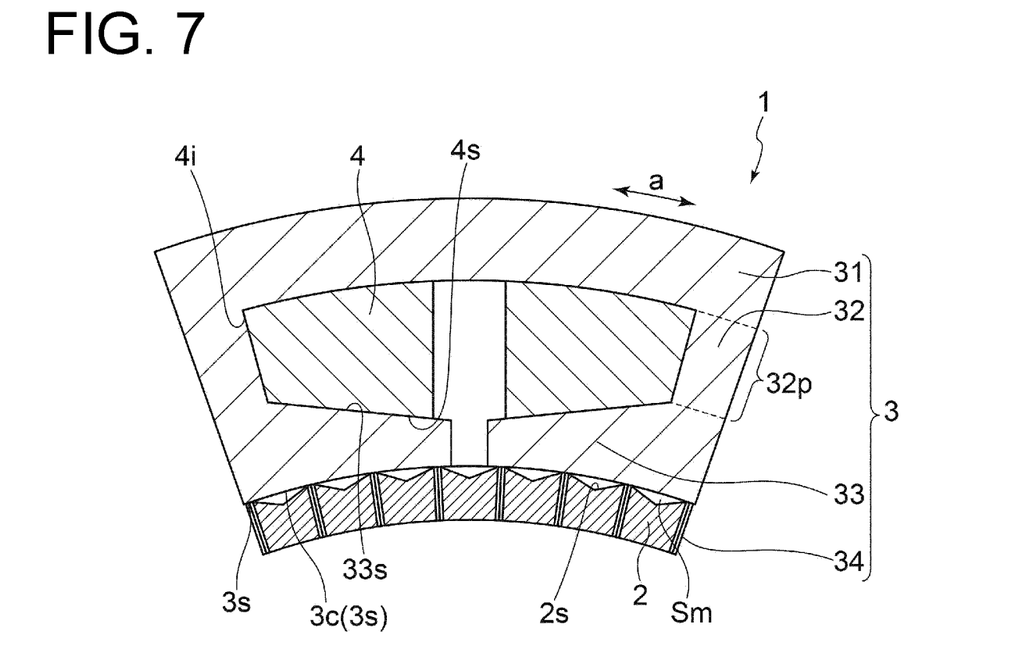
FIG. 7 is a cross-sectional view schematically showing a part of the outer diameter side magnet field according to an embodiment of the present invention.
Figure 8:
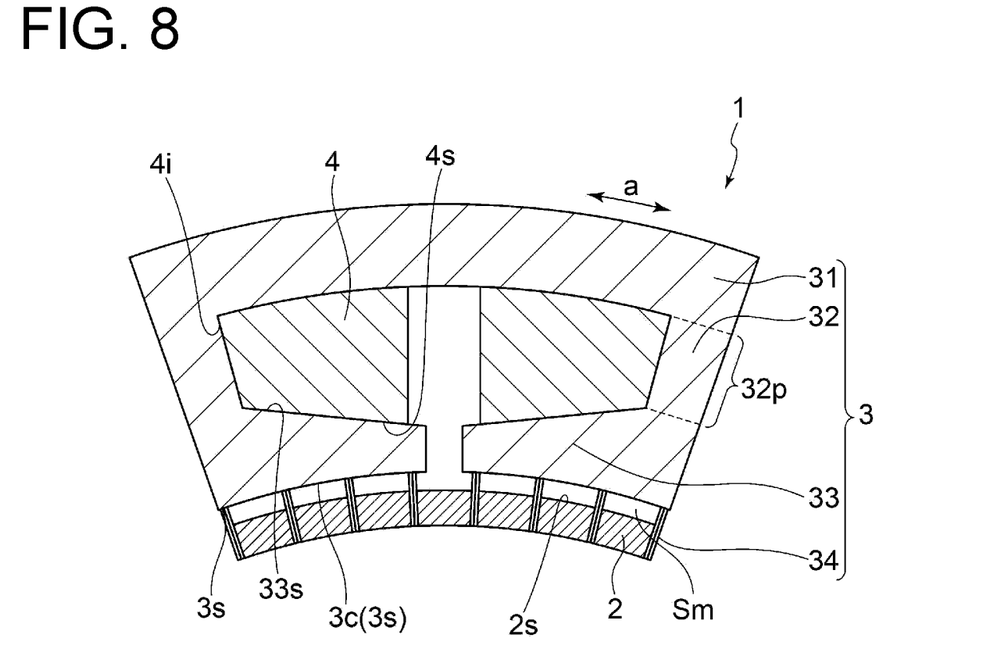
FIG. 8 is a cross-sectional view schematically showing a part of the outer diameter side magnet field according to an embodiment of the present invention.

Further, in the outer diameter side magnet field 1 having the above configuration, in some embodiments, as shown in FIGS. 6 to 8, a space (magnet side space Sm) along the axial direction b is formed in at least a part between the outer circumferential surface 2s of each of the plurality of magnetic pole pairs 2 of the outer diameter side magnet field 1 and an opposite surface 3c of the inner circumferential surface 3s of the support member 3 opposite to the outer circumferential surface 2s of each of the plurality of magnetic pole pairs 2 described above. The magnet side space Sm is formed over the entire length of the outer diameter side magnet field 1 in the axial direction b.

More specifically, in some embodiments, as shown in FIG. 6, the above-described magnet side space Sm may be formed by a support member side recess 3d extending along the axial direction b on the opposite surface 3c of the support member 3. In some other embodiments, as shown in FIG. 7, the above-described magnet side space Sm may be formed by a magnetic pole pair side recess 2d extending along the axial direction b on the opposite surface 3c of the support member 3. In some other embodiments, the above-described magnet side space Sm may be formed by both the support member side recess 3d and the magnetic pole pair side recess 2d described above.

Alternatively, in some other embodiments, as shown in FIG. 8, the above-described magnet side space Sm may be formed by holding, with the support member 3, the magnetic pole pair 2 of the outer diameter side magnet field 1 at a certain distance away from the opposite surface 3c (inner circumferential surface 3s) of the support member 3 over the circumferential direction a. In the embodiment shown in FIG. 8, the length of each magnetic pole pair 2 in the radial direction c is shorter than that in FIGS. 6 and 7. Then, the above-described magnet side space Sm is formed by holding each magnetic pole pair 2 closer to the magnetic pole piece device 5 side when each magnetic pole pair 2 is held by the two adjacent protruding parts 34 as described above.

With the above configuration, the space (magnet side space Sm) is provided between the magnetic pole pair 2 (magnet) of the outer diameter side magnet field 1 and the support member 3 for supporting the magnetic pole pair 2. Thus, it is possible to further increase the heat conduction resistance between the coil 4 and the magnetic pole pair 2, and it is possible to reduce the amount of heat transfer from the coil 4 to the magnetic pole pair 2. Further, since the cooling medium C such as cooling air can pass through the above-described space, it is possible to increase the cooling surface of the magnetic pole pair 2 of the outer diameter side magnet field 1, and it is possible to improve the cooling capacity thereof.

The present invention is not limited to the above-described embodiments, and also includes an embodiment obtained by modifying the above-described embodiments and an embodiment obtained by combining these embodiments as appropriate.

For example, the outer diameter side magnet field 1 may include the coil end space Sc and the magnet side space Sm described above.

(Appendix)

(1) An outer diameter side magnet field (1) according at least one embodiment of the present invention is an outer diameter side magnet field (1) of a magnetic gear (9) which is disposed on an outer circumferential side of a plurality of magnetic pole pieces (51) disposed on an outer circumferential side of an inner diameter side magnet field (7) along a circumferential direction (a), that includes: a plurality of magnetic pole pairs (2) disposed on the outer circumferential side of the plurality of magnetic pole pieces (51) along the circumferential direction (a); a support member (3) for supporting the plurality of magnetic pole pairs (2) from the outer circumferential side; and a coil (4) installed in the support member (3). The support member (3) includes: a yoke part (31); a teeth part (32) protruding from the yoke part (31) to an inner side in a radial direction (c) and having an iron core portion (32p) around which the coil (4) is wound; and a hook part (33) extending in the circumferential direction (a) from an inner portion of the teeth part (32) in the radial direction (c). A space is provided between an outer circumferential surface of the hook part (33) and an end surface of the coil (4) on the inner side in the radial direction (c).

With the above configuration (1), the outer diameter side magnet field (1) includes the plurality of magnetic pole pairs (2) (stator magnets) and the support member (3) for the plurality of magnetic pole pairs (2), and the space is provided between the outer circumferential surface of the hook part (33) of the support member (3) and the end surface of the coil (4) facing the inner side in the radial direction (c). Thus, it is possible to reduce or eliminate the contact area between the coil (4) and the hook part (33), and it is possible to suppress the amount of heat transfer transmitted in the path of the coil (4)→the hook part (33)→the magnetic pole pair (2). In other words, since the main heat transfer path is the coil (4)→the teeth part (32) (iron core portion (32p)) →the hook part (33)→the magnetic pole pair (2), heat conduction resistance between the coil (4) and the magnetic pole pair (2) increases, and it is possible to reduce the amount of heat transfer from the coil (4) to the magnetic pole pair (2). Further, since the cooling medium (C) can flow through the above-described space, it is possible to increase a surface (cooling surface) of the coil (4) and the support member (3) in contact with the cooling medium (C), and it is possible to have a structure where the outer diameter side magnet field (1) is cooled more easily. Thus, it is possible to provide the outer diameter side magnet field (1) improved in reliability, for example, it is possible to more reliably prevent the situation where the temperature of the magnetic pole pair (2) of the outer diameter side magnet field (1) exceeds the upper limit value.

(2) In some embodiments, in the above configuration (1), a low thermal conductivity layer (L) having a lower thermal conductivity than surroundings is formed between the yoke part (31) and an inner circumferential surface of the support member (3).

With the above configuration (2), the low thermal conductive layer (L) is disposed on the heat path between the coil (4) and each magnetic pole pair (2). Thus, the heat of the coil (4) via the support member (3) can be less likely to be transferred to the magnetic pole pair (2), and by offering protection against heat while prioritizing the magnetic pole pair (2) with the relatively strict temperature tolerance over the coil (4) with the relatively gentle temperature tolerance, it is possible to more reliably protect the outer diameter side magnet field (1) from the heat of the magnetic pole pair (2).

(3) In some embodiments, in the above configuration (2), the support member (3) includes: an outer circumferential side support member (3a) including at least the yoke part (31); and an inner circumferential side support member (3b) supported on an inner circumferential side of the outer circumferential side support member (3a), the inner circumferential side support member (3b) including at least a portion of the hook part (33), and the low thermal conductive layer (L) is formed between the outer circumferential side support member (3a) and the inner circumferential side support member (3b).

With the above configuration (3), the support member (3) is formed of the outer circumferential side support member (3a) and the inner circumferential side support member (3b), and the low thermal conductive layer (L) is disposed between these joint portions. Thus, the low thermal conductive layer (L) can easily and appropriately be formed with respect to the outer diameter side magnet field (1).

(4) An outer diameter side magnet field (1) according at least one embodiment of the present invention is an outer diameter side magnet field (1) of a magnetic gear (9) which is disposed on an outer circumferential side of a plurality of magnetic pole pieces (51) disposed on an outer circumferential side of an inner diameter side magnet field (7) along a circumferential direction (a), that includes: a plurality of magnetic pole pairs (2) disposed on the outer circumferential side of the plurality of magnetic pole pieces (51) along the circumferential direction (a); and a support member (3) for supporting the plurality of magnetic pole pairs (2) from the outer circumferential side. A space along an axial direction (b) is formed in at least a part between an outer circumferential surface of each of the plurality of magnetic pole pairs (2) and an opposite surface of an inner circumferential surface of the support member (3) opposite to the outer circumferential surface of each of the plurality of magnetic pole pairs (2).

With the above configuration (4), the space is provided between the magnetic pole pair (2) of the outer diameter side magnet field (1) and the support member (3) for supporting the magnetic pole pair (2). Thus, it is possible to further increase the heat conduction resistance between the coil (4) and the magnetic pole pair (2), and it is possible to reduce the amount of heat transfer from the coil (4) to the magnetic pole pair (2). Further, since the cooling medium (C) such as cooling air can pass through the above-described space, it is possible to increase the cooling surface of the magnetic pole pair (2) of the outer diameter side magnet field (1), and it is possible to improve the cooling capacity thereof.

(5) In some embodiments, in the above configuration (4), the space is formed by a support member (3) side recess extending along the axial direction (b) on the opposite surface of the support member (3).

With the above configuration (5), the above-described space is formed by the recessed groove formed on the support member (3) side. Thus, it is possible to appropriately form the above-described space.

(6) In some embodiments, in the above configuration (4) or (5), the space is formed by a magnetic pole pair (2) side recess extending along the axial direction (b) on the outer circumferential surface of each of the magnetic pole pairs (2).

With the above configuration (6), the above-described space is formed by the recess formed on the magnetic pole pair (2) side of the outer diameter magnet field (1). Thus, it is possible to appropriately form the above-described space.

(7) In some embodiments, in the above configuration (4), the space is formed by holding, with the support member (3), the magnetic pole pairs (2) at a certain distance away from the opposite surface of the support member (3) over the circumferential direction (a).

With the above configuration (7), the above-described space is formed by separately holding, with the holding portion, the inner circumferential surface of the holding portion and the outer circumferential surfaces of the magnetic pole pairs (2) of the outer diameter side magnet field (1) opposite to each other. Thus, it is possible to appropriately form the above-described space.

(8) A magnetic gear (9) according to at least one embodiment of the present invention includes: the outer diameter side magnet field (1) according to any one of the above configurations (1) to (7); an inner diameter side magnet field (7) disposed on an inner diameter side relative to the outer diameter side magnet field (1); and a plurality of magnetic pole pieces (51) disposed between the outer diameter side magnet field (1) and the inner diameter side magnet field (7) along a circumferential direction (a).

With the above configuration (8), the magnetic gear (9) such as a magnetic geared motor includes the above-described outer diameter side magnet field (1). Thus, the same effects as in the above configurations (1) to (7) are achieved.

REFERENCE SIGNS LIST

1 Outer diameter side magnet field
2 Magnetic pole pair
2s Outer circumferential surface of magnetic pole pair
2d Magnetic pole pair side recess
3 Support member
3s Inner circumferential surface of support member
3c Opposite surface of support member to magnetic pole pair
31 Yoke part
32 Teeth part
32p Iron core portion
33 Hook part
33s Outer circumferential surface of hook part
34 Protruding part
3a Outer circumference side support member
3b Inner circumferential side support member
3d Support member side recess
4 Coil
4s End surface of coil
4i Inner surface of coil
5 Magnetic pole piece device
51 Magnetic pole piece
52 Outer circumferential cover member
53 Inner circumferential cover member
54 Interjacent space
7 Inner diameter side magnet field
71 Inner diameter magnetic pole pair
72 Inner diameter support member
9 Magnetic gear
Sc Coil end space
Sm Magnet side space
L Low thermal conductive layer
D Cooling medium
G Air gap
H Housing
l Axis
a Circumferential direction
b Axial direction
c Radial direction

The invention claimed is:

1. An outer diameter side magnet field pole piece assembly for a magnetic gear which is disposed on an outer circumferential side of a plurality of magnetic pole pieces disposed on an outer circumferential side of an inner diameter side magnet field pole piece assembly along a circumferential direction, comprising:
   a plurality of magnetic pole pairs disposed on the outer circumferential side of the plurality of magnetic pole pieces along the circumferential direction; and
   a support member for supporting the plurality of magnetic pole pairs from the outer circumferential side,
   wherein a space along an axial direction is formed in at least a part between an outer circumferential surface of each of the plurality of magnetic pole pairs and an opposite surface of an inner circumferential surface of the support member opposite to the outer circumferential surface of each of the plurality of magnetic pole pairs, the space allowing a cooling medium supplied to the magnetic gear to flow.

2. The outer diameter side magnet field pole piece assembly according to claim 1,
   wherein the space is formed by a support member side recess extending along the axial direction on the opposite surface of the support member.

3. The outer diameter side magnet field pole piece assembly according to claim 1,
   wherein the space is formed by a magnetic pole pair side recess extending along the axial direction on the outer circumferential surface of each of the magnetic pole pairs.

4. The outer diameter side magnet field pole piece assembly according to claim 1,
   wherein the space is formed by holding, with the support member, the magnetic pole pairs at a certain distance away from the opposite surface of the support member over the circumferential direction.

5. A magnetic gear, comprising:
   the outer diameter side magnet field pole piece assembly according to claim 1;
   an inner diameter side magnet field pole piece assembly disposed on an inner diameter side relative to the outer diameter side magnet field pole piece assembly; and
   a plurality of magnetic pole pieces disposed between the outer diameter side magnet field pole piece assembly and the inner diameter side magnet field pole piece assembly along a circumferential direction.

* * * * *